Patented Aug. 1, 1933

1,920,587

UNITED STATES PATENT OFFICE 1,920,587

ANTIRICKETIC SUBSTANCE AND THE PRODUCTION THEREOF

August J. Pacini, Chicago, Ill., assignor to Sun-A-Sured, Inc., a Corporation of Delaware No Drawing. Application February 4, 1928
Serial No. 252,049

3 Claims. (Cl. 99—11)

This invention relates to anti-ricketic products and the like, and with regard to certain more specific features, to the production of anti-ricketic and similar substances.

Among the several objects of the invention may be noted the treatment of substances which elaborate growth-producing substances, hereinafter for brevity termed vitamin $a$, to produce anti-ricketic substances, which includes the so-called vitamin D. This invention includes the increased production of vitamin bodies from materials so constituted chemically as to permit this production. Other objects will be in part obvious and in part pointed out hereinafter.

The invention accordingly comprises the elements and combination of elements, steps and sequence of steps, features of synthesis and arrangements of parts which will be exemplified in the description hereinafter and the scope of the application of which will be indicated in the following claims.

I have found that the growth-producing substance vitamin A is composed of several individual growth-producing components or substances. One of these components produces an anti-xero-phthalmic effect, which may comprise a separate vitamin. For the purpose of description in this invention this growth-producing, apparently anti-xerophthalmic lacking substance will be referred to as "vitamin $a$".

It is to be understood that the invention embodies the displacement of vitamin bodies from one form to another, as, for example, the displacement of vitamin $a$ with the appearance of vitamin D, the latter being growth-producing and anti-ricketic. It is possible that this displacement is caused by a direct transformation of vitamin $a$ to vitamin D.

The invention is carried out by the use of enzymes, as set forth in the following process:

Cholesterol in its usual state is insoluble in water, but soluble in alcohol. If an alcoholic solution of cholesterol is poured into water, the cholesterol precipitates, causing the solution to become opalescent. The cholesterol is now in a condition to be used as a substrate for the preparation of the aforementioned vitamin D. If this suspension, as it may be termed, is acted upon at room temperature by taka-diastase (a preparation representing the diastase extract from aspergillus oryzae) the following tests are satisfied, indicating that a vitamin has been formed:

1. A quantitative lowering of the melting point, attributable only to the formation of a new substance.
2. Typical spectographic absorption changes, such as a change in band formations and polariscopic rotation.
3. Development of the anilin color reaction.
4. Animal responses.

The substrate need not be cholesterol. I have found that the oil extracted by pressure from ordinary seeds, such as millet, contains traces of vitamin A but no vitamin D. If, however, the millet seeds are first sprouted in a dark room, dried, and pressed, the oil obtained contains some vitamin D in addition to the vitamin A. Radiation, such as ultra-violet, is excluded as the possible agent for the synthesis, since the seeds have been sprouted in a dark room. The explanation which is plausible is that the transformation is occasioned by enzymes present in the plant, in all probability diastase in addition to others.

Therefore, enzymes represented by those obtained from aspergillus oryzae, a mold, are found to be active as agents for the production of vitamin D from suitable substrates containing activatable material represented by cholesterol as a member of the class. The enzymes yielded by aspergillus oryzae are partially recognized (for example, amidase, diastase, catalase, inulase, invertase, lactase, lipase, maltase, protease, rennet and sulfatase) and partially unrecognized. Other active enzymes are, for example, tyrosinase and phenolase and carbolase. These are but examples of enzymes that can be obtained from preparations such as aspergillus niger, myxomycetes, saprolegniales, or the like. It is to be understood that the invention is not limited to those enzymes mentioned.

It should be noted that ordinarily taka-diastase is known mainly for its starch digestion effect; but I have found that it acts upon lipoids, such as said cholesterol, not with a digestion change, but with the effect of removing at least some of the cholesterol, together with any vitamin $a$ present, and producing vitamin D, or with the effect of converting anti-ricketically inactive lipoids to anti-ricketically active lipoids.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. The method of producing vitamins comprising suspending lipoids and treating them with aspergillus oryzae.

2. The method of producing vitamins comprising suspending cholesterol and treating it with aspergillus.

3. The method of producing vitamins comprising suspending cholesterol in a liquid so as to produce an opalescent suspension and treating it with aspergillus oryzae.

AUGUST J. PACINI.